United States Patent [19]

Winblad et al.

[11] Patent Number: 4,880,409

[45] Date of Patent: Nov. 14, 1989

[54] FEEDING DEVICE

[76] Inventors: Bengt Winblad, Inst. f. Seriatrik, Karolimhe, S-14186 Huddinge; Astrid Norberg, Inst. f. Omvardnadsforskning, Universitet, S-90187 Umea, both of Sweden

[21] Appl. No.: 138,905

[22] PCT Filed: Mar. 31, 1987

[86] PCT No.: PCT/SE87/00165
§ 371 Date: Feb. 22, 1988
§ 102(e) Date: Feb. 22, 1988

[87] PCT Pub. No.: WO87/06458
PCT Pub. Date: Nov. 5, 1987

[30] Foreign Application Priority Data

Apr. 21, 1986 [SE] Sweden .................................. 8601830

[51] Int. Cl.$^4$ ............................................. A61M 31/00
[52] U.S. Cl. ......................................... 604/73; 604/77; 604/214

[58] Field of Search ...................... 604/75, 73, 77, 132, 604/212; 222/93, 95

[56] References Cited

U.S. PATENT DOCUMENTS

| 75,693 | 3/1868 | Morrell | 604/214 |
| 3,104,032 | 9/1963 | Hansen | 604/77 X |
| 4,581,021 | 4/1986 | Landau et al. | 604/212 |

FOREIGN PATENT DOCUMENTS 7905307 6/1979 Sweden .

Primary Examiner—Stephen C. Pellegrino
Attorney, Agent, or Firm—Pollock, Vande Sande & Priddy

[57] ABSTRACT

A device for feeding a dosage of mashed food into the mouth of a patient. The device consists of a spoon-like feeding head (10) having an internal feeding channel (11), which is connected to a tubular, flexible container (20). The latter can be compressed for feeding a dosage by two mutually pivotable handle pieces (30,40).

9 Claims, 1 Drawing Sheet

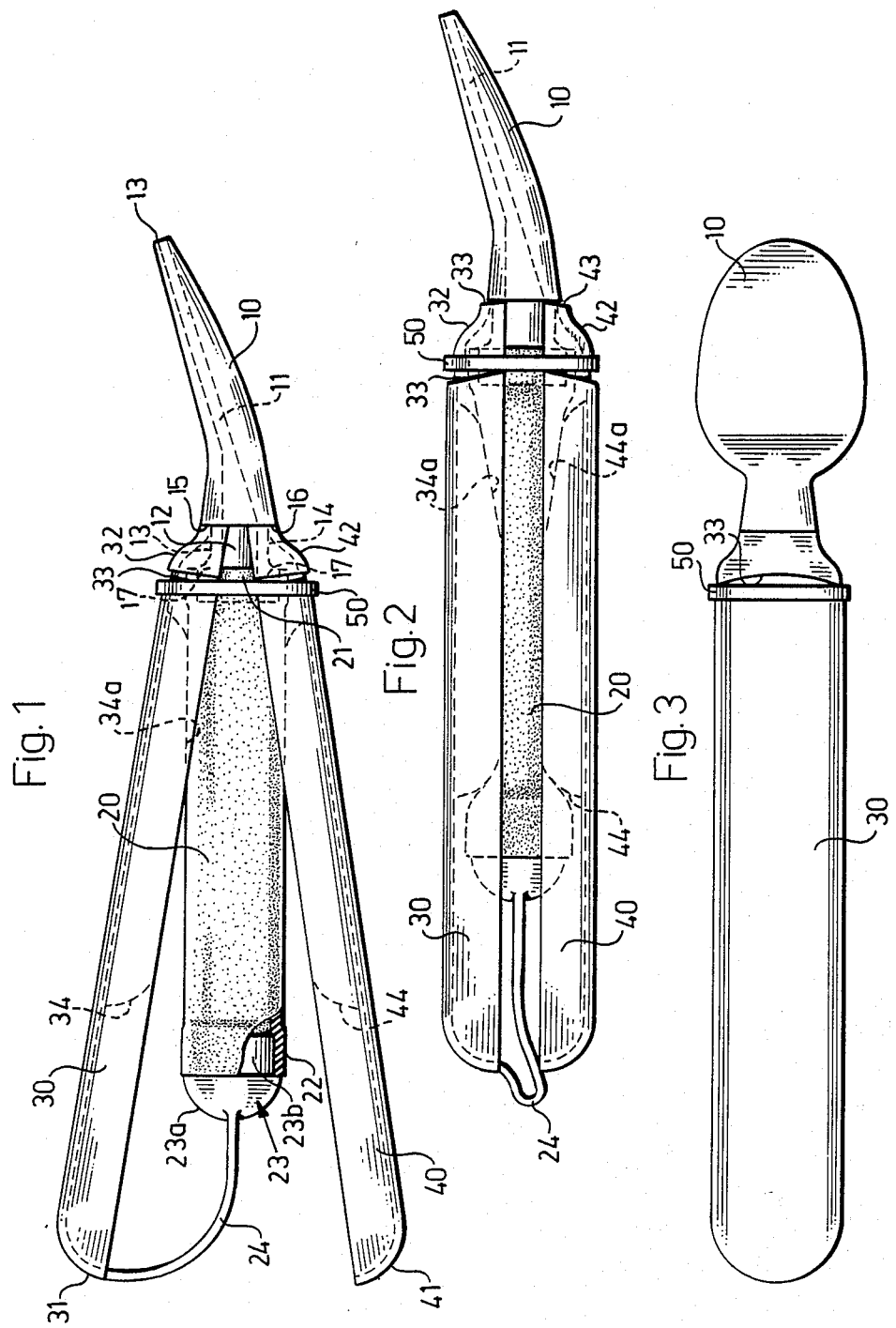

4,880,409

FEEDING DEVICE

FIELD OF THE INVENTION

The invention relates to a device for feeding a dosage of food into the mouth of a person, especially an elderly patient, and comprises a flexible container for receiving a dosage of food, said container being compressable for the discharge of said dosage through a feeding channel in a spoon-like feeding head.

BACKGROUND OF THE INVENTION

A similar device (see SE-B-7905307-0) is intended for the feeding of a dosage of liquid medicine into a child's mouth. The known device has a spoon part with a near neck, which is provided with an internal feeding channel and is connected to a relatively flat, flexible container serving as a spoon handle. The transversal side portions of the flat container are held apart from each other by means of two spring members extending from the rear neck of the spoon part along the inside of the respective transversal side of the container. By pressing these transversal sides towards each other directly by hand, the container can be compressed, and when the pressure is released, a dosage of liquid medicine can be sucked into the container through the feeding channel. Then, while feeding the child in a regular manner by the use of the spoon, the food can be mixed with a dosage of liquid medicine by simultaneously compressing the container.

SUMMARY OF THE INVENTION

The object of the present invention, on the other hand, is to provide a device for the feeding of a dosage of food, in the form of a liquid and/or, in particular, a mash, such as mashed potatoes, possibly containing small bits of solid food, into the mouth of a patient who has difficulty in eating in the normal way with a knife and fork or even with a spoon. Especially elderly patients have to be fed by another person, e.g., by a nurse, and quite a few patients cannot eat from a spoon even with such help. Thus, there is a need for a special device, which will enable these patients to be fed neatly from, e.g., a plate with mashed food.

According to the invention, this object is fulfilled by a flexible container device which is tubular and compressable between two handle pieces which are mutually pivotable like a pair of tongs. The helping person holds the two handle pieces in one hand and presses the handle pieces towards each other. The mashed food can be sucked into the container by letting the handle pieces pivot away from each other while the container expands by itself. The feeding head is then inserted into the patient's mouth and the dosage of mashed food is fed into the mouth by pressing the handle pieces together again.

BRIEF DESCRIPTION OF THE DRAWINGS

Further advantageous features of the device will appear from the following detailed description of a preferred embodiment, reference being made to the appended drawings, in which:

FIG. 1 is a side view of the device in rest position with the handle pieces apart from each other;

FIG. 2 is a corresponding side view of the device in an operative position with the handle pieces pressed towards each other; and FIG. 3 is a plan view of the device in the rest position of FIG. 1.

DESCRIPTION OF PREFERRED EMBODIMENT

The device consists of a spoon-like feeding head 10, a flexible, tubular container 20 connected to the feeding head 10, and a pair of handle pieces 30,40 disposed on each side of the tubular container 20 and being mutually pivotable so as to compress the container 20.

The feeding head 10 is shaped with outer contours like a spoon blade but has no concavity for receiving food. Instead, it has an internal feeding channel 11 extending along the whole longitudinal length thereof, i.e., from a rear neck portion 12 to the front end 13'. The geometrical external shape of the feeding head is designed to give the device the general impression of a spoon and to facilitate the insertion of the feeding head into the patient's mouth, but the function of the spoon-like feeding head is quite different, namely, to enable suction of a dosage of mashed food into the container 20 and feeding of the dosage through the internal feeding channel 11.

The neck portion 12 of the feeding head 10 projects backwardly from the rear end thereof so as to form an upper recess 13 and a lower recess 14, respectively, between front shoulders 15 and 16, respectively, and a rear, radially wider connection part 17, which is cylindrical to permit the tubular container, constituted by a hose 20, to be fitted onto the external cylindrical surface of the connection part 17.

The feeding head 10 is preferably made of a dishwashable thermoplastic material, such as polycarbonate or the like.

The flexible hose 20, on the other hand, is made of a softer material, such as silicon rubber, and is resilient enough to permit said connection of its front end portion 21 onto the part 17 of the feeding head 10 and the insertion of a closure plug 23 at the rear end portion 22, the end portions 21,22 being slightly expanded to provide a tight fit. The plug 23 has an outer hemispherical part 23a, connected to the handle piece 30 by a cord 24, and an inner cylindrical part 23b, onto which the rear end portion 22 of the hose 20 is fitted.

Each handle piece 30,40, which is made by injection molding of a rather rigid, dish-washable thermoplastic material, such as polycarbonate, is substantially rectilinear in the longitudinal direction and has a substantially C-shaped cross-section with an external, convex side and an internal, concave side. The rear end 31,41, respectively, is curved into a smooth substantially spherical surface portion, whereas the front end portion 32,42 is tapered radially inwards towards the longitudinal central axis thereof, as shown in FIGS. 1 and 2 (in the pivotal plane of the handle pieces 30,40) and in FIG. 3 (in a longitudinal plane normal to said pivotal plane), so that the external surface of each front end portion 32,42 adjoins the spoon-like feeding head 10 smoothly. Also, by this design, the front end portion 32,42 of each handle piece 30,40 will project radially inwardly into the recess 13 and 14, respectively, in the rear neck portion 12 of the feeding head 10. Thus, the axial end surface 33 and 43, respectively (see FIG. 2) of the front end portion 32, 42 abuts the front shoulder 15 and 16, respectively, in the open position of the handle pieces as shown in FIG. 1, as well as in the closed position thereof as shown in FIG. 2, whereas the concave inside surface part of each front end portion 32,42 abuts the axial front end 21 of the hose 20 fitted onto the radially wider connection part 17 of the neck portion 12 of the feeding head 10. The front end portion 32,42 of each handle piece 30,40 is thereby confined in a well-defined axial position relative to the feeding head 10. To prevent the two handle pieces 30,40 from moving apart from each other at their front end portions 32,42, a ring member 50, preferably made of steel, encloses these front end portions 32,42 and is retained axially in a transversal groove 33,43 in each front end portion 32,42. As shown in the drawing figures, each groove 33,43 is slightly wider in its central portion to permit the handle pieces 30,40 to pivot between the positions shown in FIGS. 1 and 2.

It will be apparent that each handle piece 30,40 is pivotable about a respective pivot axis located in the plane of the ring member 50 slightly above and below, respectively, the central longitudinal axis of the neck portion 12 of the feeding head 10. Of course, it is also possible to provide a similar pivotal arrangement by way of transversal pivot pins through the two front end portions 32 42, to provide either a common pivotal axis or slightly separated pivotal axes.

However, the illustrated embodiment without pivot pins has the advantage that the device can easily be dismantled by pulling off the hose 20 from the connection part 17 of the feeding head 10, whereupon the ring member 50 and the handle pieces 30,40 become loose and can be completely separated from each other.

At the concave inside of each handle piece 30,40 there is formed a unitary, rigid body 34,44, respectively, extending longitudinally therealong in the region of the hose 20. In the illustrated embodiment, the rigid body 34,44 is dimensioned to partly fill the inside concavity of each handle piece except for the front portion 34a,44a thereof, which is tapered towards the front end, as shown in FIGS. 1 and 2. Moreover, the rear and front ends are smoothly curved.

When the handle pieces 30,40 are manually operated so as to be pivoted in the closing direction towards each other, the rigid bodies 34,44 will compress the hose 20 therebetween, as illustrated in FIG. 2. Because of the tapered front portions 34a, 44a, the corresponding front portion of the hose will be only partially compressed, whereby the contents therein, i.e., a dosage of mashed food, wil easily be pressed out through the feeding channel 11 of the feeding head 10 into the patient's mouth.

In the closed position, as shown in FIG. 2, the compressed hose 20 will exert a separating force, because of the elastic resiliency of the material, on the rigid bodies 34,44 and the handle pieces 30,40, so that, when the manual pressure is released, the latter will automatically pivot into the open rest position, as shown in FIG. 1, wherein the hose 20 has assumed its original cylindrical configuration. During such expansion of the hose 20, a new dosage of mashed food can be sucked in through the feeding channel 11, e.g., from a plate with food.

After feeding a patient, the various parts (feeding head 10, hose 20, handle piece 30 with the attached plug 23, handle piece 40 and ring member 50) are separated from each other before dish-washing.

The device can also be used for the feeding of animals.

We claim:

1. A device for feeding a dosage of nutrient into the mouth of a person, said device comprising
   (a) a flexible tubular container (20) for receiving a said dosage;
   (b) a spoon-like feeding head (10) connected to said container and having an internal longitudinal feeding channel (11) extending entirely therethrough;
   (c) first and second handle pieces (30, 40) disposed on opposite sides of said container, said handle pieces being spaced apart in rest position, but being pivotable toward each other about respective pivot axes located between said container and said feeding head, so as to compress said container to force said dosage through said feeding channel into said mouth;
   (d) each of said first and second handle pieces being provided with an internal, longitudinally extending rigid body tapered toward a front end thereof, for squeezing said tubular container when said handle pieces are pivoted towards each other.

2. A feeding device as defined in claim 1, wherein said handle pieces are held apart in rest position solely by the elastic resiliency of said tubular container.

3. A feeding device as defined in claim 1 or 2, wherein said tubular container is constituted by a hose which is closable at a first end and connectable to a neck portion projecting from said feeding head at a second end.

4. A feeding device as defined in claim 1, wherein each said handle piece has an outwardly convex and an inwardly concave cross-section, said rigid body being located on the concave inside of a respective handle piece.

5. A feeding device as defined in claim 4, wherein each said handle piece and the associated rigid body are made in one unitary piece.

6. A feeding device as defined in claim 1, wherein a front end portion of each said handle piece projects radially inwardly into a recess formed at a rear end portion of said feeding head, so that said respective handle piece is axially positioned relative to said feeding head, and a holding means is provided to radially hold said front end portion of each handle piece in said recess so as to retain said handle pieces in their axial positions while permitting their relative pivoting movement.

7. A feeding device as defined in claim 6, wherein said holding means is constituted by an external ring member surrounding said front end portions of said handle pieces.

8. A feeding device as defined in claim 6, wherein said ring member is axially confined in an external groove in each handle piece.

9. A feeding device as defined in claim 6, wherein said recess is formed by a neck portion extending from a rear end portion of said feeding head and having a radially widened rear end part, to which said flexible tubular container is connectable.

* * * * *

UNITED STATES PATENT AND TRADEMARK OFFICE
CERTIFICATE OF CORRECTION

PATENT NO. : 4,880,409

DATED : NOVEMBER 14, 1989

INVENTOR(S) : Sven-Eric JUHLIN; Hakan BERGKVIST; Bengt WINBLAD; Astrid NORBERG

It is certified that error appears in the above-identified patent and that said Letters Patent is hereby corrected as shown below:

On the title page:

The names of two inventors have been omitted and the addresses of the listed ones are incorrect. The correct names and addresses of all the inventors should read:

(1) Sven-Eric JUHLIN
    Ergonomi Design Gruppen AB
    Box 14021
    61 14 Bromma, Sweden (2) Håkan BERGKVIST
    Ergonomi Design Gruppe AB
    Box 14021
    161 14 Bromma, Sweden (3) Bengt WINBLAD
    Dept of Geriatric Medicine
    Karolinska Institute
    Huddinge University Hospital
    S-141 86 Huddinge
    Sweden (4) Astrid NORBERG
    Dept of Advanced Nursing
    Box 1442
    S-901 24 UMEA
    Sweden Signed and Sealed this Eighth Day of October, 1991

Attest:

HARRY F. MANBECK, JR.

*Attesting Officer*  *Commissioner of Patents and Trademarks*